2,203,786

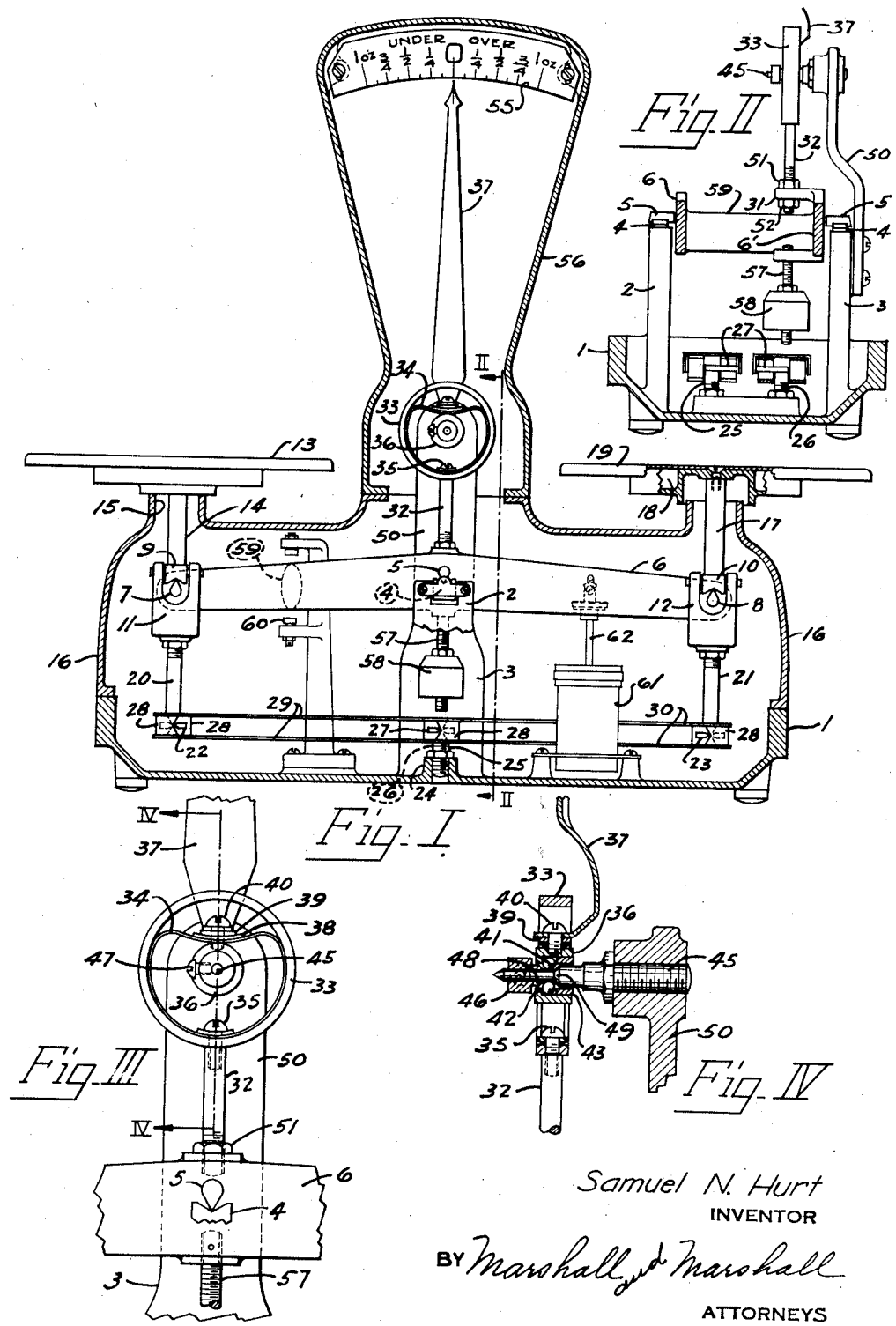
June 11, 1940.   S. N. HURT   2,203,786
WEIGHING SCALE
Filed Jan. 27, 1938
Samuel N. Hurt
INVENTOR
BY Marshall & Marshall
ATTORNEYS Patented June 11, 1940

UNITED STATES PATENT OFFICE 2,203,786

WEIGHING SCALE

Samuel N. Hurt, Toledo, Ohio, assignor to Toledo Scale Manufacturing Company, Toledo, Ohio, a corporation of New Jersey Application January 27, 1938, Serial No. 187,234

5 Claims. (Cl. 265—59)

This invention relates generally to weighing scales, and more particularly to scales of the predetermined weight type.

One of its principal objects is to provide an improved even balance scale which indicates when it is in equilibrium or the amount over or under a predetermined weight.

Another object is the provision of an indicator which is pivotally mounted on a fixed axis and actuated by an improved load resistance.

Another object is the provision of a circular frame for supporting a yieldable load resistance member.

A further object is the provision of a yieldable resistance element mounted on the scale beam and cooperating with an independently mounted indicator member to counterbalance loads and indicate weights.

And still another object is the provision of improved means for adjusting the sensibility of the scale.

These, and other objects and advantages will be apparent from the following description, in which reference is had to the accompanying drawing illustrating a preferred embodiment of the invention and wherein similar reference numerals refer to similar parts throughout the several views.

In the drawing:

Fig. I is a front elevational view of a predetermined weight scale embodying the invention, parts being broken away and parts being shown in section.

Fig. II is a fragmentary end elevational view thereof sectioned substantially along the line II—II of Fig. I.

Fig. III is an enlarged fragmentary front elevational view showing particularly the load resistance element and the fulcrum of the indicating member; and, Fig. IV is an end elevation sectioned substantially along the line IV—IV of Fig. III.

Referring to Figures I to IV, the base or main frame 1 of the scale is a substantially pan-shaped rigid casting. Upwardly extending posts 2 and 3, integral with the base, are provided in their upper ends with suitable pivot bearings 4 upon which fulcrum pivots 5 of an even armed lever 6 are oscillatably mounted. Upwardly directed load pivots 7 and 8, fixed in the free ends of the lever 6, support bearings 9 and 10 which are seated in counterbalance platter spider 11 and load receiver spider 12 respectively.

For the purpose of supporting a counterpoise platter 13, the counterpoise spider 11 has stems 14 studded therein. These stems 14 project upwardly through openings 15 in a base casing 16, that is fastened to the upwardly directed edges of the pan-shaped base 1 and completely houses the lever mechanism. Similar stems 17, studded into the load spider 12, have bolted thereto a loading box 18 and load receiving platter 19. The loading box 18 is designed to receive lead shot, or other small weights to adjust the balance of the lever mechanism in the usual manner.

To maintain the condition of level of the platters 13 and 19, the spiders 11 and 12 are provided with depending stems 20 and 21 respectively. These stems 20 and 21 carry on their lower ends pivots 22 and 23 which have opposed knife edges. A plane that passes vertically through the edges of fulcrum pivots 5 of the lever 6 also bisects two holes drilled through a boss 24 cast on the bottom of the vase 1, and threaded in these holes are studs 25 and 26 which are provided with opposed knife edge pivots 27. These pivots 27 are similar to the pivots 22 and 23 and engage suitable bearings 28 on the inner ends of check links 29 and 30 whose opposite ends engage the aforementioned pivots 22 and 23. Since check links of the type referred to are well known in the art their function is not described herein.

The mechanism thus far described comprises an even balance scale which is adapted to compare weights placed on the platters 13 and 19 and to indicate, by the condition of balance, when a difference in these weights exist. It is an object of the invention, however, to indicate the amount of the difference in the weights of the masses on the platforms in terms of units of weight and to accomplish this one of the side bars 6' of the lever 6 is provided with an inwardly projecting lip 31 to which the lower end of a short stem 32 is fastened. An annular frame 33 is secured to the upper end of this stem and a load resistance member 34 of thin, flexible steel in the shape of a circular loop, is clamped to the bottom of this annular frame 33 by a screw 35. At a point diametrically opposite the clamping screw 35 the loop 34 is clamped to a ball bearing housing 36 which forms the hub of an indicator 37. The means for clamping the resistance member 34 to the hub 36 comprises a small formed plate 38, a washer 39 whose lower face is round to conform to the radius of the plate 38 and a clamping screw 40. The lower end of the indicator 37 is bent at an angle of 90° to its longitudinal axis and is interposed between the head of the screw 40 and the washer 39.

The indicator hub comprises, in addition to the aforementioned ball bearing housing 36, a plurality of bearing balls 41 which are retained in the housing by an integral flange 42 and a bushing 43 which is pressed into the interior of the housing. This indicator assembly is pivotally mounted on a hardened and ground shaft 45 studded, in a horizontal position, in bracket 50 which is bolted to a machined pad on the fulcrum bearing post 3 (Fig. II). This indicator assembly is retained on the shaft 45 by a collar 46, which is locked on the shaft 45 by means of a screw 47. A conical portion 48 of the collar 46 enters the bearing housing 36 and in cooperation with a conical shoulder 49 on the shaft 45 forms a race-way for the bearing balls 41.

The load resistance loop 34 is somewhat smaller in diameter than the inside diameter of the annular member 33, but the distance between the points on the hub 36 and the annular frame at which the resistance loop is attached to these two members is such that when the loop is fastened to these members it is compressed and it assumes substantially a heart shape, and its lower portion is forced into engagement with the inner wall of the annular frame substantially as shown in Fig. III. This construction prevents the resistance loop 34 from assuming an unbalanced position and exerting unequal pressures on the two sides of the annular member 33, thus constraining the indicator 37 to maintain the zero position in relation to the chart, when there is no load on the platters 13 and 19, or loads thereon are equal.

Since it is an object of the invention to visually indicate the difference in the amounts of the weights on the platters, in standard units of weight, it is necessary that the load resistance member 34 be capable of adjustment so that it will offer a lesser or greater resistance to the same angular movement of the lever 6. To accomplish this the threaded stem 32 of the load resistance member which passes freely through an aperture in the inwardly projecting portion of the arm 6' of the lever 6, is provided with a nut 51, which engages the upper face of the projecting portion 31 and a nut 52 engaging the lower face. It is apparent that when the nut 52 is loosened and the nut 51 tightened the stem 32 with the annular member 33 is raised and the resistance member 34 subjected to increased tension. It is also obvious that when the reverse adjustment is made the tension is decreased and the indicator 37 is adapted to swing through a greater angle for the same difference between the weights of the loads on the platters.

An indicia bearing chart 55 is fixedly positioned in the upper end of an indicator housing 56 which surmounts the base casing 16. This chart cooperates with the indicator 37 to visually indicate the unbalanced increment of the load.

In scales of the type herein described it is necessary that all pendulum effect of the assembled scale members be eliminated so that the scale will indicate accurately when in an unlevel position. For this purpose a stem 57 is dependingly studded into the arm 6' of the lever 6, directly below the fulcrum pivot 5 and a weight 58 is adjustably threaded thereon.

When a counterpoise, for example, a standard two-pound weight is placed on the platter 13 the lever 6 will rock about its fulcrum until the cross-arm 59 of the lever 6 engages a bumper 60. This motion is transmitted through the stem 32, member 33 and the yieldable resistance 34 to the indicator 37 which rocks about its fulcrum until it points toward the ungraduated space on the chart 55 at the left of the 1 oz. indicium. If the commodity weighing two pounds is now placed on the platter 19, its weight moment counterbalances the weight moment of the two-pound counterpoise on the platter 13, the lever will assume a balanced position and the indicator will point to the zero indicium. If the commodity on the platter 19 however weighs more than 2 pounds, for example, 2 pounds ¼ ounce, the additional weight will carry the lever 6 through the balanced position in a clockwise direction and the resistance member 34 will counterbalance that portion of the load which is greater than the 2 pounds which are counterbalanced by the counterpoise on the platter 13. The member 34 will move the indicator 37 a proportionate angle and it will point to the ¼ oz. indicium on the chart 55.

As is customary in scales of this kind, a dashpot 61 connected by a plunger stem 62 is pivotally connected to the lever 6 to absorb shocks and dampen the vibration during use.

It will be seen that the embodiment of the invention shown herein is well suited to fulfill the objects primarily stated; however, it is to be understood that the invention is susceptible to variation, modification and change within the spirit and scope of the subjoined claims.

Having described the invention, I claim:

1. In a device of the class described, in combination, a frame, an even-armed lever mounted on said frame, a counterpoise receiving platter and a load receiving platter pivotally mounted on opposite ends of said lever, an indicator antifrictionally mounted on said frame independently of said lever, load resistance means mounted upon and movable with said lever, said load resistance means comprising an annular frame adjustably mounted on said lever, a thin resilient metallic member flexed into a substantially circular loop having a diameter smaller than the diameter of said annular frame and mounted within said frame and clamping means between said substantially circular loop and said indicator.

2. In a device of the class described, in combination, a frame, an even-armed lever mounted on said frame, a counterpoise receiving platter and a load receiving platter pivotally mounted on opposite ends of said lever, an indicator having a hub antifrictionally mounted on said frame independently of said lever, load resistance means mounted upon and movable with said lever, said load resistance means comprising an annular frame adjustably mounted on said lever, a thin resilient metallic member flexed into a substantially circular loop having a diameter smaller than the diameter of said annular frame and mounted within said frame, said hub of said indicator extending into said annular frame and clamping means between said substantially circular loop and said hub.

3. In a device of the class described, in combination, a frame, upwardly extending posts on said frame for supporting pivots of an even-armed lever, load receivers mounted on opposite ends of said lever, an indicator having a hub mounted on said frame independently of said lever, a chart mounted on said frame for cooperation with said indicator, a laterally extending lip on said lever and a load resistance means comprising an annular frame, a substantially circular flexure member mounted on said frame, a stem secured to said annular frame and projecting through an aperture in said lip of said lever and nuts threaded on said stem above and below said lip for shifting the relative distance between said indicator hub and said circular annular frame for adjusting the tension of said substantially circular resistance member and means for connecting said substantially circular resistance member and said indicator hub.

4. In a device of the class described, in combination, an even-armed lever, a load counterpoise platter, and a load receiving platter mounted on opposite ends of said lever, an indicator pivotally mounted independently of said lever, fractional load counterbalancing means connecting said lever and said indicator, said fractional load counterbalancing means comprising a resilient loop and a rigid frame surrounding and engaging the major portion of the periphery of said resilient loop.

5. In a device of the class described, in combination, a manually actuated load counterbalancing mechanism comprising an even arm lever, automatic load counterbalancing means comprising a resilient metallic closed loop, a frame mounted on said even arm lever and supporting said loop by engaging the major portion of its periphery, an indicator mounted independently of said even arm lever, and clamping means for connecting said resilient metallic loop to said indicator.

SAMUEL N. HURT.